United States Patent
Williamson

(10) Patent No.: US 11,725,764 B2
(45) Date of Patent: Aug. 15, 2023

(54) FLUID CONDUIT INTERLOCK

(71) Applicant: Trelleborg Westbury Limited, Tewkesbury (GB)

(72) Inventor: Mark Williamson, Wilsthsire (GB)

(73) Assignee: Trelleborg Westbury Limited, Tewkesbury (GB)

(*) Notice: Subject to any disclaimer, the term of this patent is extended or adjusted under 35 U.S.C. 154(b) by 189 days.

(21) Appl. No.: 17/192,527

(22) Filed: Mar. 4, 2021

(65) Prior Publication Data
US 2021/0278024 A1    Sep. 9, 2021

(30) Foreign Application Priority Data
Mar. 5, 2020  (GB) .................................... 2003207

(51) Int. Cl.
| | |
|---|---|
| *F16L 37/44* | (2006.01) |
| *F16L 23/028* | (2006.01) |
| *F16L 23/036* | (2006.01) |
| *F16L 23/00* | (2006.01) |

(52) U.S. Cl.
CPC ........... *F16L 37/44* (2013.01); *F16L 23/0283* (2013.01); *F16L 23/036* (2013.01); *F16L 23/006* (2013.01); *Y10T 29/49826* (2015.01)

(58) Field of Classification Search
CPC ... F16L 23/0283; F16L 23/036; F16L 23/003; F16L 23/006; F16L 37/44; F16L 37/18; F16L 37/20; F16L 37/28; F16L 37/32; F16L 37/38; F16L 37/46; F16L 37/1205; F16L 29/02; F16L 29/04
USPC .................. 285/358, 312, 314, 394
See application file for complete search history.

(56) References Cited

U.S. PATENT DOCUMENTS

| | | | | |
|---|---|---|---|---|
| 1,910,706 | A * | 5/1933 | Malzard | F16L 37/1205 |
| | | | | 285/314 |
| 3,558,161 | A * | 1/1971 | Bormioli | F16L 37/1205 |
| 3,642,307 | A * | 2/1972 | Brickhouse | F16L 37/1205 |
| 3,664,634 | A * | 5/1972 | Guertin | F16L 37/18 |
| 4,030,524 | A | 6/1977 | McMath et al. | |

(Continued)

FOREIGN PATENT DOCUMENTS

| | | |
|---|---|---|
| EP | 0 122 987 | 10/1984 |
| EP | 3 470 722 | 4/2019 |
| SE | 529464 | 8/2007 |

OTHER PUBLICATIONS

Search Report on GB2003207.4 dated Oct. 6, 2020.

*Primary Examiner* — Zachary T Dragicevich
*Assistant Examiner* — William S. Choi
(74) *Attorney, Agent, or Firm* — Foley & Lardner LLP

(57) ABSTRACT

A fluid conduit interlock comprises at least one retention member for engaging a fluid conduit, the or each retention member configured to be movable between a retention position for retaining the fluid conduit and a release position for releasing the fluid conduit, a valve member configured to be movable between a valve open position for opening a hollow bore and a valve closed position for closing the hollow bore, and an interlock mechanism configured to operably link the movement of the or each retention member and the movement of the valve member so that the or each retention member in the release position locks the valve member in the valve closed position and so that the valve member in the valve open position locks the or each retention member in the retention position.

18 Claims, 18 Drawing Sheets

(56) References Cited

U.S. PATENT DOCUMENTS

| | | | | |
|---|---|---|---|---|
| 4,202,567 | A * | 5/1980 | Paddington | F16L 37/1205 |
| 4,234,161 | A * | 11/1980 | Wilder | F16L 37/44 |
| 6,843,511 | B2 * | 1/2005 | Barry | |
| 9,074,713 | B2 * | 7/2015 | Janssen | F16L 37/1205 |
| 2018/0202593 | A1 * | 7/2018 | Hudson | F16L 37/44 |

* cited by examiner

FLUID CONDUIT INTERLOCK

CROSS-REFERENCE TO RELATED PATENT APPLICATIONS

This application claims the benefit of and priority to UK Application No. GB2003207.4, filed on Mar. 5, 2020, the entire disclosure of which is hereby incorporated by reference herein.

BACKGROUND

This invention relates to a fluid conduit interlock and a method of operating a fluid conduit interlock.

It is known to use a valve to selectively open and close a hollow bore in a pipeline to control the flow of flowable material in the pipeline.

SUMMARY

According to a first aspect of the invention, there is a fluid conduit interlock including at least one retention member for engaging a fluid conduit, the or each retention member configured to be movable between a retention position for retaining the fluid conduit and a release position for releasing the fluid conduit, a valve member configured to be movable between a valve open position for opening a hollow bore and a valve closed position for closing the hollow bore, and an interlock mechanism configured to operably link the movement of the or each retention member and the movement of the valve member so that the or each retention member in the release position locks the valve member in the valve closed position and so that the valve member in the valve open position locks the or each retention member in the retention position.

In use, the fluid conduit interlock is used in a fluid transmission assembly that is capable of transferring flowable material such as liquids and gases, particularly water, cryogenic fluids, liquid natural gas, petrochemicals and hydrocarbons. The invention is applicable to a wide range of fluid conduits such as, but not limited to, a pipeline, a manifold, a hose, a shut-off valve, a release coupling, a breakaway coupling and a section thereof. The fluid conduit may be rigid or flexible.

The valve member when at its valve open position opens the hollow bore to permit flowable material to flow along the hollow bore and therefore along the fluid transmission assembly. The valve member when at its valve open position may be positioned at different angles relative to the cross-section of the hollow bore. Preferably the valve member when at its valve open position bisects the hollow bore to minimise resistance to the flow of the flowable material along the hollow bore.

The inclusion of the interlock mechanism in the fluid conduit interlock of the invention enables the coupling of the movements of the or each retention member and the valve member to provide an isolation valve function with an interlocking capability. This not only improves the safety and reliability of the fluid transmission assembly by ensuring that the fluid conduit stays retained by the or each retention member when the valve member opens the hollow bore but also ensures that the hollow bore stays closed when the fluid conduit is released by the or each retention member. This is especially important in applications (such as transfers involving vehicle-to-fuel dispenser, vessel-to-shore or vessel-to-vessel arrangements) where quick release of the fluid conduit is desirable without any adverse impact in terms of safety and costs. Otherwise, in the absence of the interlocking mechanism, it would be necessary to go through a lengthy sequence of safety steps before releasing the fluid conduit in order to avoid the risk of spillage.

When the fluid conduit interlock includes a plurality of retention members, the retention members may be circumferentially spaced apart at irregular or regular intervals.

In a preferred embodiment of the invention, the or each retention member may be configured for engaging a flange of the fluid conduit, the or each retention member configured to be movable between the retention position for retaining the flange and the release position for releasing the flange. Configuring the or each retention member for selectively engaging and releasing the flange provides a reliable means for the or each retention member to selectively engage and release the fluid conduit.

In embodiments of the invention, the interlock mechanism may be configured to operably link the movement of the or each retention member and the movement of the valve member so that the or each retention member is permitted to freely move between the retention and release positions when the valve member is in the valve closed position and/or so that the valve member is permitted to freely move between the valve open and closed positions when the or each retention member is in the retention position.

In further embodiments of the invention, the interlock mechanism may include at least one first interlock member and a second interlock member. The second interlock member may be movable between first and second positions. The movement of the second interlock member may be operably linked to the movement of the valve member so that the second interlock member is in a first position when the valve member is in the valve closed position and so that the second interlock member is in a second position when the valve member is in the valve open position. The or each retention member may be configured to be movable from the retention position to the release position to displace the or the respective first interlock member into engagement with the second interlock member so as to lock the second interlock member in the first position. The second interlock member in the second position may be configured to prevent the displacement of the or the respective first interlock member into engagement with the second interlock member so as to prevent the movement of the or each retention member from the retention position to the release position.

The above interaction between the first and second interlock members not only provides a reliable means of carrying out the function of the interlock mechanism but also provides a means for detecting and confirming the state of the interlock mechanism, e.g. through visual and/or position sensing.

The structure and configuration of the or each first interlock member may vary to permit the or each retention member to displace the or the respective first interlock member into engagement with the second interlock member so as to lock the second interlock member in the first position. For example, the or each first interlock member may be an abutment member, and the or each retention member may be configured to be movable from the retention position to the release position to abut the or the respective abutment member into engagement with the second interlock member so as to lock the second interlock member in the first position. The configuration of the or each retention member as an abutment member provides reliable engagement between the first and second interlock members to securely lock the second interlock member in the first position.

When it is no longer required to lock the valve member in the valve closed position, the first interlock member is preferably configured to release the second interlock member from the first position. For example, the or each first interlock member may be spring-loaded to urge the or each first interlock member to disengage from the second interlock member when the or each retention member is moved from the release position to the retention position. Such spring-loading of the or each first interlock member enables automatic disengagement of the or each first interlock member from the second interlock member, without requiring operator intervention, when the or each retention member is no longer in the release position to displace the or the respective abutment member into engagement with the second interlock member.

The structure and configuration of the second interlock member may vary so long as the second interlock member remains capable of performing its function. For example, the second interlock member may include an annular ring or at least one annular ring segment, the second interlock member rotatable between the first and second positions. The annular, or partially annular, structure of such a second interlock member is especially compatible with cylindrical fluid transmission assemblies.

The manner in which the or each first interlock member interacts with the second interlock member may vary in order to facilitate the interlocking between the or each retention member and the valve member. For example, the second interlock member may include at least one receptacle for receiving the or each respective first interlock member, and the or each first interlock member may be configured to be movable into and out of the or each receptacle. Inserting the or each first interlock member into the or each receptacle restricts the movement of the second interlock member in order to lock the position of the second interlock member. Removing the or each first interlock member from the or each receptacle permits the free movement of the second interlock member between the first and second positions.

In a preferred embodiment, the or each receptacle includes a bore, the or each bore having a tapered section through which the or each first interlock member may pass in order to move into and out of the or the respective receptacle. The inclusion of the tapered section in the bore of the or each receptacle helps prevent the or each first interlock member from getting stuck in the or each receptacle during the process of disengaging from the or each receptacle.

The fluid conduit interlock may include an actuator (e.g. a spindle and handle) operable to move the valve member between the valve open and closed positions. Preferably the actuator includes a detent structure configured to operably locate the second interlock member when the valve member is in the valve closed position so as to lock the valve member in the valve closed position. The detent structure provides a reliable means for resisting the opening of the valve member unless a sufficiently large force or torque is applied to overcome the detent structure.

The structure and configuration of the or each retention member may vary in order to enable the movement of the or each retention member between the retention and release positions to carry out selective engagement and release of the fluid conduit. For example, the or each retention member may be a clamp configured to be pivotable between the retention and release positions. The provision of the or each clamp is particularly useful not only for selective engagement and release of the flange of the fluid conduit but also for selective engagement and release of the fluid conduit in an axial direction, which may be beneficial in environments with space constraints.

The or each clamp may form part of a flange assembly. Non-limiting examples of the flange assembly are disclosed in UK patent publication no. GB 2567471 A, European patent publication no. EP 3 470 722 A1 and US patent publication no. US 2019/0113161 A1. Exemplary flange assemblies comprise a flange in the form of a disc-shaped rim for connection to a hose, pipe, manifold or other fluid conduit, the flange defining a contact face for engagement, in use, with a contact face of an opposed flange; and one or more clamps spaced circumferentially around the contact face of the flange, each clamp including a clamp body pivotably secured to the flange and a clamp member mounted on the clamp body for movement relative thereto, the clamp body being movable between a first, retracted position and a second, clamping position in which a clamp face of the clamp member faces the contact face of the flange, the clamp member being movable relative to the clamp body to adjust the position of the clamp face relative to the contact face of the flange and thereby adjust a clamping force created between the clamp face and the contact face of the flange to retain, in use, an opposing flange in face to face engagement with the contact face of the flange.

In still further embodiments of the invention, the fluid conduit interlock may include a blank configured to removably engage the or each retention member so as to maintain the or each retention member in the release position. When the fluid conduit is released by the or each retention member, the blank may be used to maintain the or each retention member in the release position in order to lock the valve member in the valve closed position, thus ensuring that the hollow bore stays closed.

The fluid conduit interlock of the invention may include a valve housing defining the hollow bore along which flowable material may flow, the valve member arranged inside the valve housing. In such embodiments, the interlock mechanism may be attached to, mounted on or integral with the valve housing.

According to a second aspect of the invention, there is provided a method of operating a fluid conduit interlock, wherein the fluid conduit interlock is in accordance with any one of the fluid conduit interlock of the first aspect of the invention and its embodiments, wherein the method comprises the steps of: providing a fluid conduit, releasing the fluid conduit by moving the valve member to the valve closed position and then moving the or each retention member to the release position, and retaining the fluid conduit by moving the or each retention member to the retention position and then moving the valve member to the valve open position.

The features and advantages of the fluid conduit interlock of the first aspect of the invention and its embodiments apply mutatis mutandis to the features and advantages of the method of the second aspect of the invention and its embodiments.

The method may include the steps of: releasing the flange of the fluid conduit by moving the valve member to the valve closed position and then moving the or each retention member to the release position, and retaining the flange of the fluid conduit by moving the or each retention member to the retention position and then moving the valve member to the valve open position.

The method may include the step of moving the or each retention member between the retention and release positions when the valve member is in the valve closed position and/or the step of moving the valve member between the valve open and closed positions when the or each retention member is in the retention position.

The method may include the steps of: moving the or each retention member from the retention position to the release position to displace the or the respective first interlock member into engagement with the second interlock member so as to lock the second interlock member in the first position, and moving the second interlock member to the second position to prevent the displacement of the or the respective first interlock member into engagement with the second interlock member so as to prevent the movement of the or each retention member from the retention position to the release position.

The method may include the step of moving the or each retention member from the retention position to the release position to abut the or the respective abutment member into engagement with the second interlock member so as to lock the second interlock member in the first position.

The method may include the step of rotating the second interlock member between the first and second positions.

The method may include the step of moving the or each first interlock member into and out of the or each receptacle.

The method may include the step of using the detent structure to locate the second interlock member when the valve member is in the valve closed position so as to lock the valve member in the valve closed position.

The method may include the step of pivoting the or each clamp between the retention and release positions.

The method may include the steps of: using the blank to engage the or each retention member so as to maintain the or each retention member in the release position, and removing the blank from the or each retention member so as to permit movement of the or each retention member from the release position.

It will be appreciated that the use of the terms "first" and "second", and the like, in this patent specification is merely intended to help distinguish between features (e.g. the first and second interlock members, the first and second positions, etc.) and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

This summary is illustrative only and is not intended to be in any way limiting.

BRIEF DESCRIPTION OF THE FIGURES

A preferred embodiment of the invention will now be described, by way of a non-limiting example, with reference to the accompanying drawings in which.

The figures are not necessarily to scale, and certain features and certain views of the figures may be shown exaggerated in scale or in schematic form in the interests of clarity and conciseness.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A fluid transmission assembly according to an embodiment of the invention is shown in the figures. The fluid transmission assembly includes a flange assembly 10, a manifold 100, a valve 200 and an interlock mechanism 300.

Figure 1:
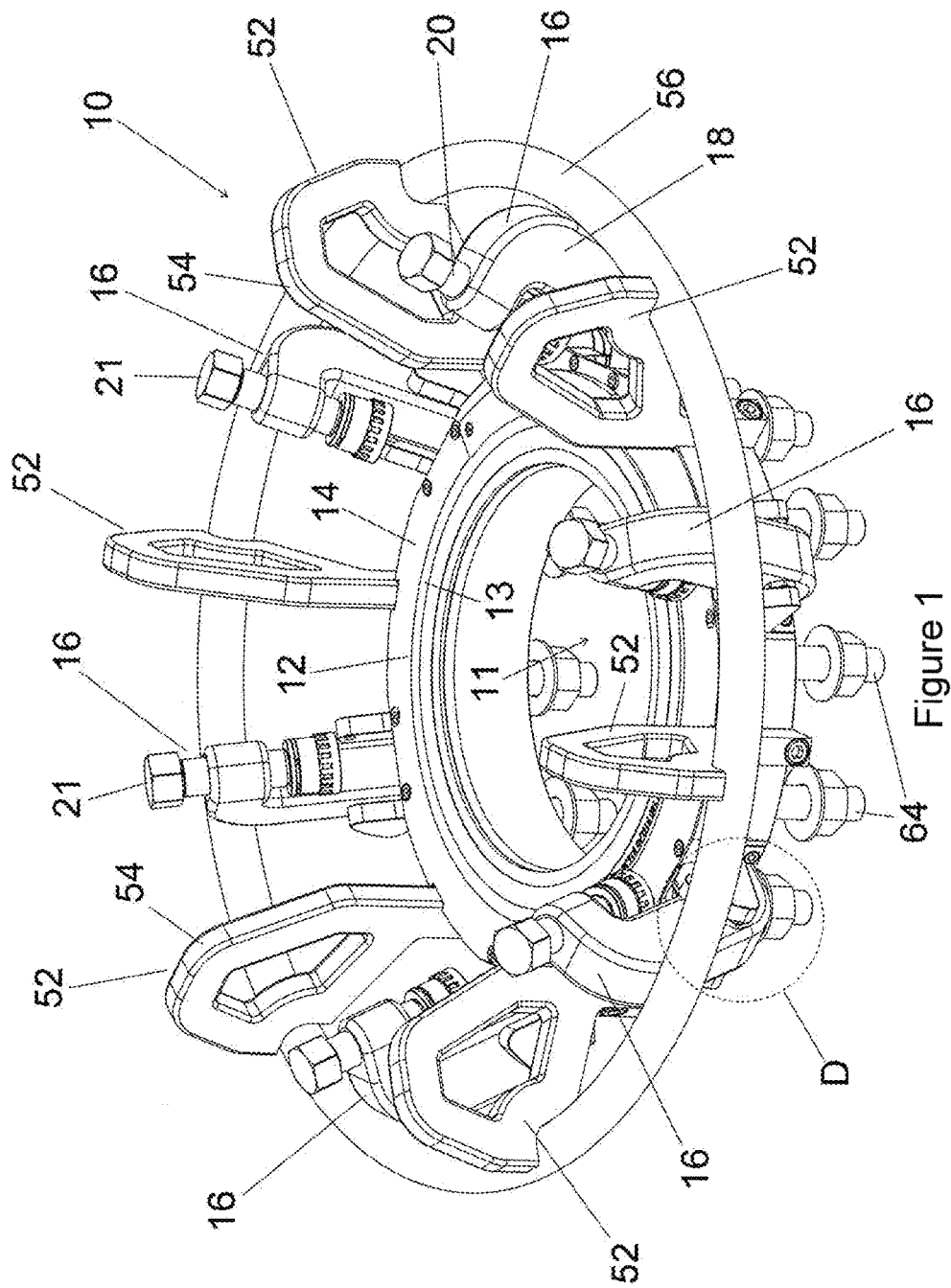
FIG. 1 shows a perspective view of a flange assembly of a fluid transmission assembly according to an embodiment of the invention.

The flange assembly 10 is shown in FIG. 1 and includes a flange 12 in the form of a disc-shaped rim. The flange 12 defines a contact face 14 for engagement, in use, with a contact face of an opposed flange 102 of the manifold 100. The flange 12 also defines a gasket seat about a central bore 11 (FIG. 2) to receive, in use, a gasket 13 and the flange assembly 10 further includes first and second opposing gasket clamp members 13a,13b mounted on the contact face 14 of the flange 12 located on opposite sides of the opening of the bore 11 to releasably retain the gasket 13 in position on the gasket seat. The first gasket clamp 13a is fixed relative to the contact face 14 of the flange 12 whilst the second gasket clamp 13b includes an adjustment mechanism 15 to facilitate movement of the second gasket clamp 13b relative to the contact face 14 of the flange 12, towards and away from the gasket seat and the opening of the bore 11. A more detailed description of the operation of the gasket clamp members 13a,13b is provided in UK patent no. 2 496 872 B.

The flange assembly 10 also includes six clamps 16 spaced circumferentially around the contact face 14 of the flange 12. Each clamp 16 includes a clamp body 18 pivotably secured to the flange 12 and a clamp member 20 mounted on the clamp body 18 for movement relative thereto.

Figure 2:
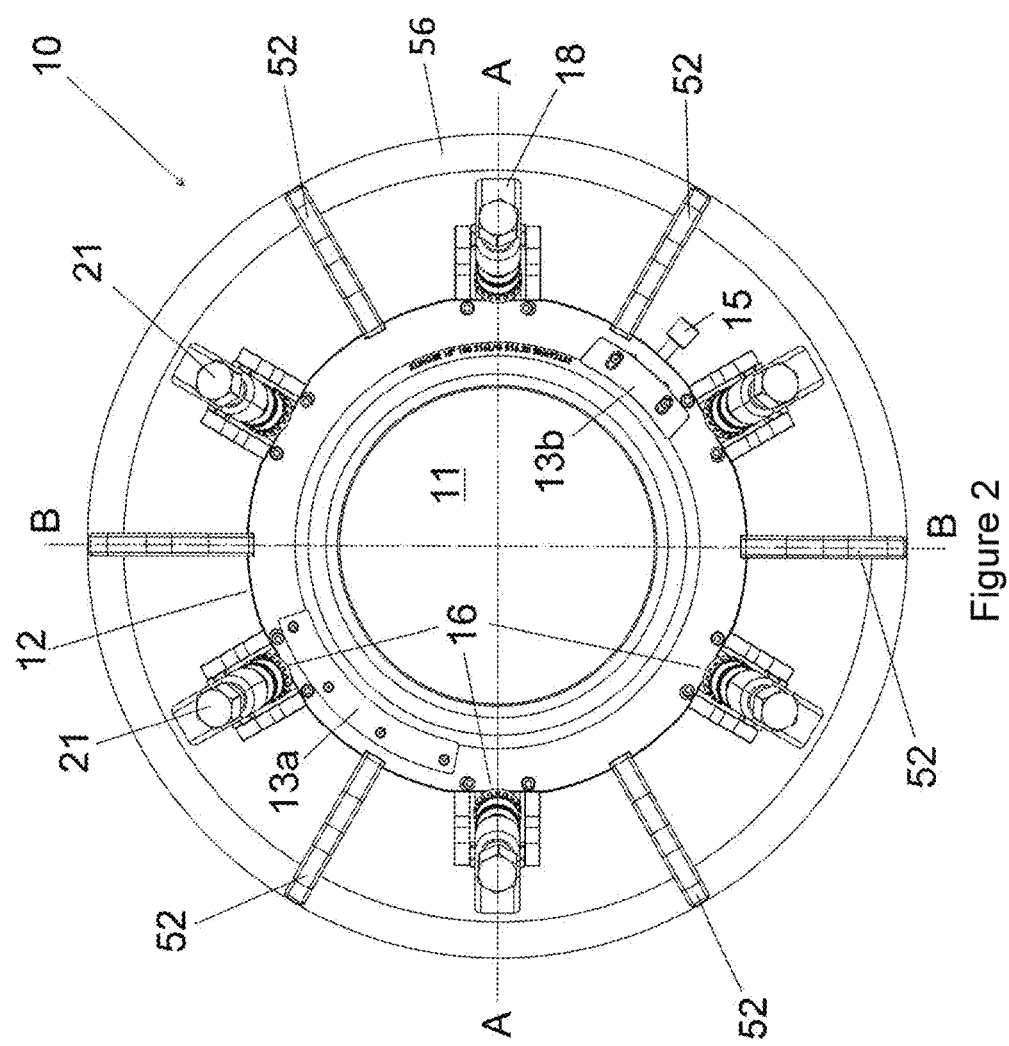
FIG. 2 shows a plan view from above of the flange assembly shown in FIG. 1.
Figure 3:
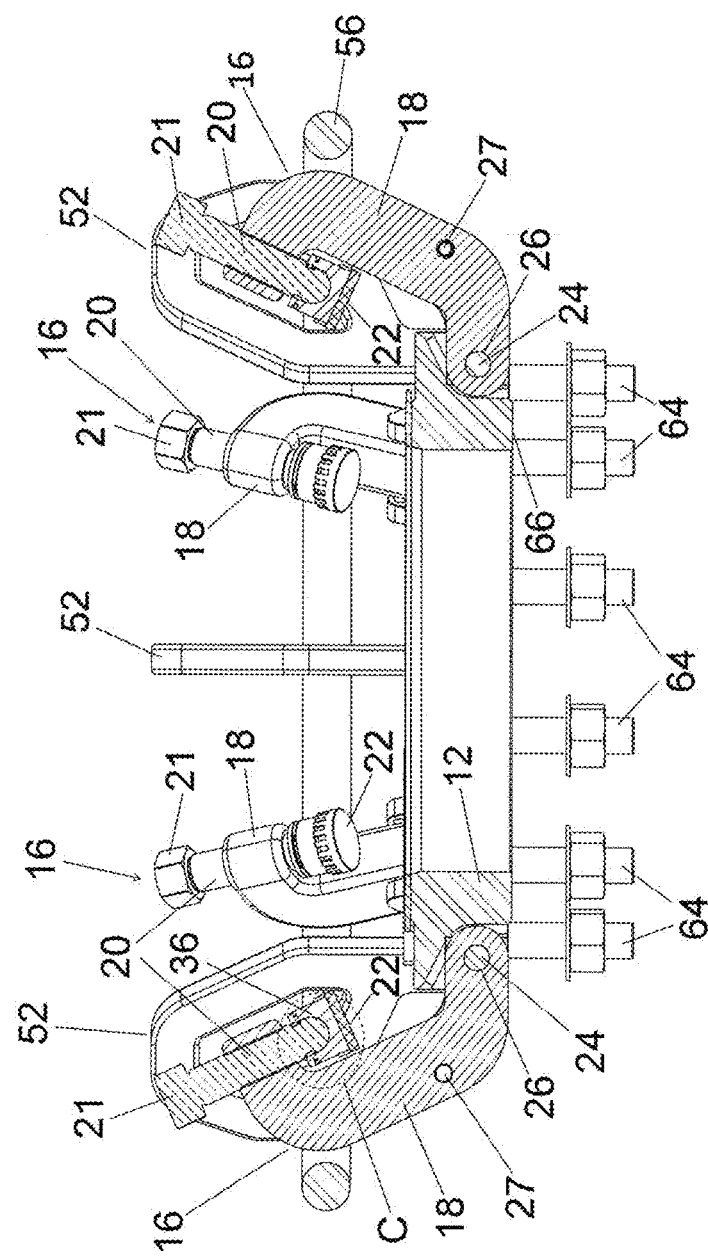
FIG. 3 shows a cross-sectional view of the flange assembly shown in FIG. 1 along the line A-A.

The clamp body 18 of each clamp 16 is shown in FIGS. 1, 2 and 3 in a first, retracted position ("release position") in which neither the clamp body 18 nor the clamp member 20 obscures or otherwise blocks the contact face 14 of the flange 12. This allows location and engagement, in use, of the opposing flange with the contact face 14 of the flange 12.

Once the opposed flange is properly located and engaged with the contact face 14 of the flange 12, the clamp body 18 is movable from the first, retracted position (shown in FIG. 1) to a second, clamping position ("retention position") in which a clamp face 22 (FIG. 3) of the clamp member 20 faces the contact face 14 of the flange 12.

In the embodiment shown in FIG. 1, the clamp member 20 is screw threadedly engaged through an aperture in the clamp body 18. This arrangement allows adjustment of the position of the clamp face 22 relative to the contact face 14 of the flange 12 on rotation of the clamp member 20—the screw threaded engagement between the clamp member 20 and the aperture through the clamp body 18 translating rotational movement of the clamp member 20 into lateral movement of the clamp member 20 relative to the clamp body 18.

Movement of the clamp face 22 of each clamp 16 relative to the contact face 14 of the flange 12 facilitates the adjustment of the clamping force created between the clamp face 22 of each clamp 16 and the contact face 14 of the flange 12 to retain the opposing flange in face to face engagement with the contact face 14 of the flange 12.

In the embodiment shown in FIG. 1, the clamp member 20 includes a hexagonal head 21. This allows adjustment to be effected through the use of conventional spanners and/or sockets.

It will be appreciated that in other embodiments movement of the clamp member 20 of each clamp 16 relative to the respective clamp body 18 may be effected through use of other mechanisms. In other embodiments, for example, a ratchet mechanism may be used to effect movement of each clamp member 20 relative to the respective clamp body 18.

Figure 4:
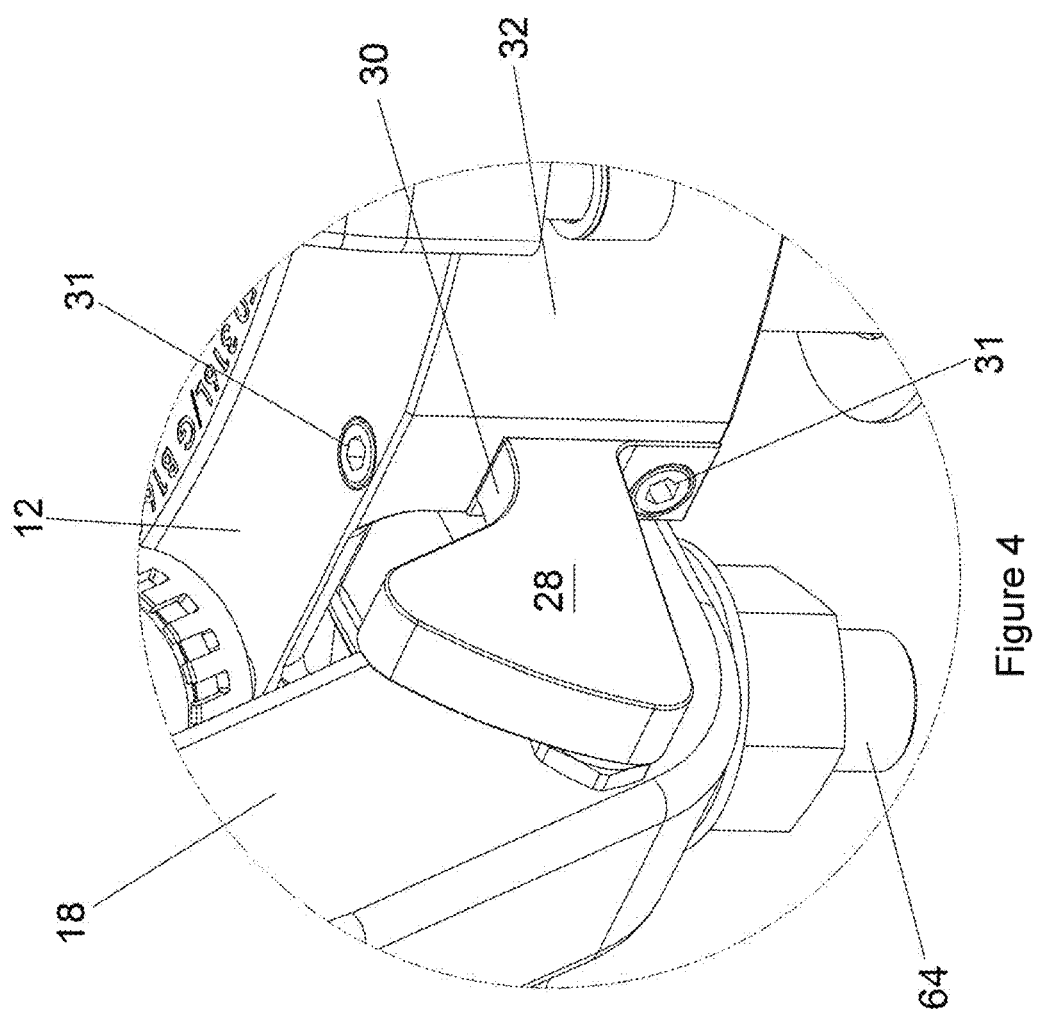
FIG. 4 shows an enlarged view of part D of FIG. 1.

Referring to FIGS. 3 and 4, it can be seen that the clamp body 18 of each clamp 16 is pivotably mounted by means of a pivot pin 24 (FIG. 3) extending through an aperture 26 in the clamp body 18. The pivot pin 24 is received at each end in a pivot block 28 (FIG. 4) such that the clamp body 18 is pivotably mounted between a pair of opposed pivot blocks 28. The pivot blocks 28 are, in turn, secured within an aperture 30 formed within the circumferential edge 32 of the flange 12 by means of screws 31.

The clamp body 18 of each clamp 16 is retained in its first, retracted position, by means of a latching mechanism. The latching mechanism includes a ball catch 19 (FIG. 5) on each of two opposing outer surfaces 23 of each clamp body 18. Each ball catch 19 includes a spherical latch element 25 held captive in an aperture 27 formed in the respective outer surface 23 of the clamp body 18 and biased by means of a spring 29 to protrude from the outer surface 23. The protruding latch element 25 engages in a first, correspondingly shaped opening 34 formed in an adjacent, inner surface 35 of a respective pivot block 28 when the clamp body 18 is located in the first, retracted position. The protruding latch element 25 also engages in a second, correspondingly shaped opening (not shown) formed in the adjacent, inner surface 35 of the pivot block 28 when the clamp body 18 is located in the second, clamping position.

Figure 5:
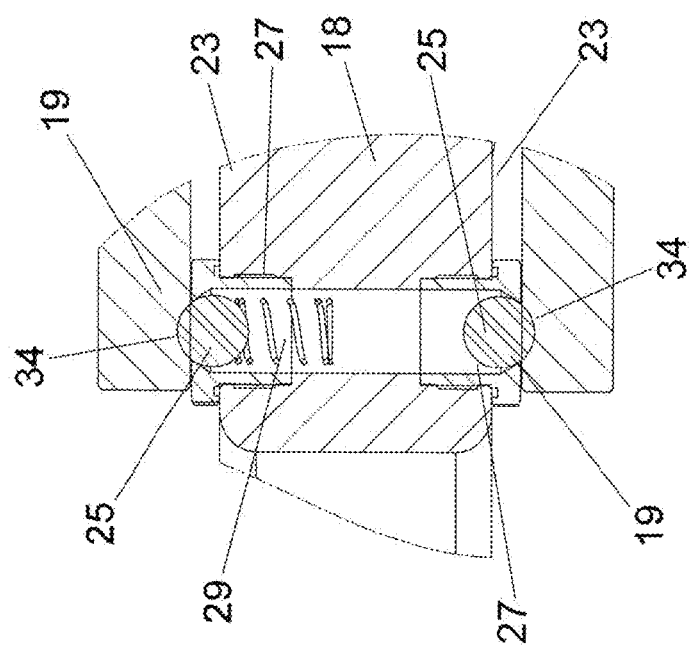
FIG. 5 shows a cross-sectional view through a clamp body and adjacent pivot block of a clamp forming part of the flange assembly shown in FIG. 1.

In the embodiment shown in FIG. 5, the opening 34 in the inner surface of the adjacent pivot block 18 is formed as a dimple or depression.

In order to move the clamp body 18 from the first, retracted position to the second, clamping position, and vice versa, a sufficient force must be applied to the clamp body in order to force the edge of each opening 34 against the respective spherical latch element 25 and cause depression of the spherical latch element 25 against the spring bias in order to allow the spherical latch element 25 to be disengaged from the opening 34 and allow movement of the clamp body 18. It will be appreciated that the size of the force required to depress each spherical latch element 25 is determined by the size of the bias against which the spherical latch element 25 must be depressed. This can be achieved through the use of a stiffer spring in order to increase the size of the force required or a softer spring in order to reduce the size of the force required.

The clamp member 20 of each clamp 16 includes a foot element 36 (FIGS. 3 and 6) mounted at an end thereof by means of a ball joint 38. The ball joint 38 defines a first shoulder 40 over which a retention clip 42 is engaged to retain the foot element 36 in position on the end of a leg element 44 of the clamp member 20. The foot element 36 defines the clamp face 22 of the clamp member 20 and is formed from a compressible material.

The use of a ball joint 38 to mount the foot element 36 to the end of the leg member 44 allows rotation of the foot element 36 relative to the leg 44. Such flexure allows the clamp face 22 to turn on the ball joint 38 on engagement against a rear surface of the opposing flange in order to maximise contact between the clamp face 22 and the rear surface of the opposing flange.

Figure 6:
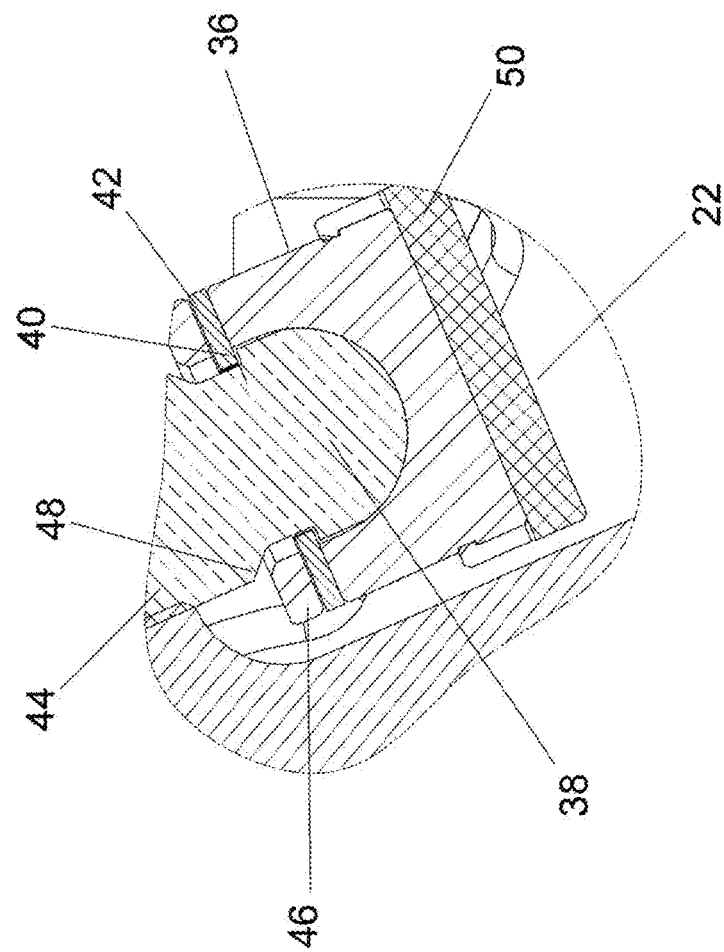
FIG. 6 shows an enlarged view of part C of FIG. 3.

The use of a compressible material to form the foot element 36 allows compression of an engagement portion 46 located between the retention clip 42 and a second shoulder 48 on the leg element 42 (FIG. 6). This compression limits and controls the degree of flexure of the foot element 36 relative to the leg member 44.

In the embodiment shown in FIG. 1, the clamp face 22 on the foot element 36 of each clamp 16 includes an insulating pad 50. This is particularly advantageous for use in cryogenic applications. In such applications, cryogenic material flowing through the fluid transmission assembly causes cooling of the flanges.

The provision of an insulating pad 50 on the foot element 36 of each of the clamps 16 reduces or prevents the flow of heat energy from the clamp member 20 to the rear surface of the opposing flange and thus prevents or at least reduces the cooling of the clamping members 20 that might otherwise injure an operator during adjustment of the position of the clamp face 22 relative to the contact face 14.

So as to assist location of the opposing flange and engagement of the opposing flange with the contact face 14 of the flange 12, the flange assembly 10 includes six guide members 52 spaced around the contact face 14 of the flange 12.

Each guide member 52 is detachably secured to the circumferential edge 32 of the flange 12 by means of two screws 55 and extends generally perpendicularly relative to the contact face 14 of the flange 12. An uppermost end of each guide member 52 reduces in width so as to define a tapered nose section 54.

In use, the guide members 52 serve to guide the flange 12 and the opposing flange into alignment readily with minimum input from an operator and thereby reducing the risk of injury.

In order to further protect the flange assembly 10 during alignment of the flange 12 with an opposing flange, a protection ring 56 extends around and is detachably secured to outer edges 58 of the guide members 52 by means of screws 60.

The protection ring 56 protects the guide members 52 and the clamps 16 during alignment of opposing ends of two fluid conduits. It will be appreciated that such fluid conduits may be significant in size and weight, hence the desire to minimise the risk of damage caused by collisions between component parts and damage caused by trapping hands or fingers there between.

The use of the guide members 52 and the detachably securable protection ring 56 allows for different arrangements and configurations depending on the flange. It thus provides a reconfigurable flange assembly 10 for use with a range of flanges. It is envisaged that the flange assembly 10 could be used with any existing flange arrangement and the flange, for example, may be provided in the form of a spool flange, a slip on flange, a weld neck flange or a studded flange.

In the arrangement shown in FIG. 1, the clamps 16 and guide members 52 are alternately arranged and equidistantly spaced, circumferentially, around the contact face 14 of the flange 12.

It will be appreciated that, in other embodiments, different numbers of clamps 16 and guide members 52 may be employed.

It will also be appreciated that in other embodiments, depending on the intended application of the flange assembly 10, the guide members 52 may be omitted or the clamps 16 may be omitted. In embodiments where the clamps 16 are omitted, it is envisaged that different clamps, through bolts or other fixing elements, would be employed to secure and maintain engagement of the opposing flange and the flange 12 in face to face contact.

Figure 7:
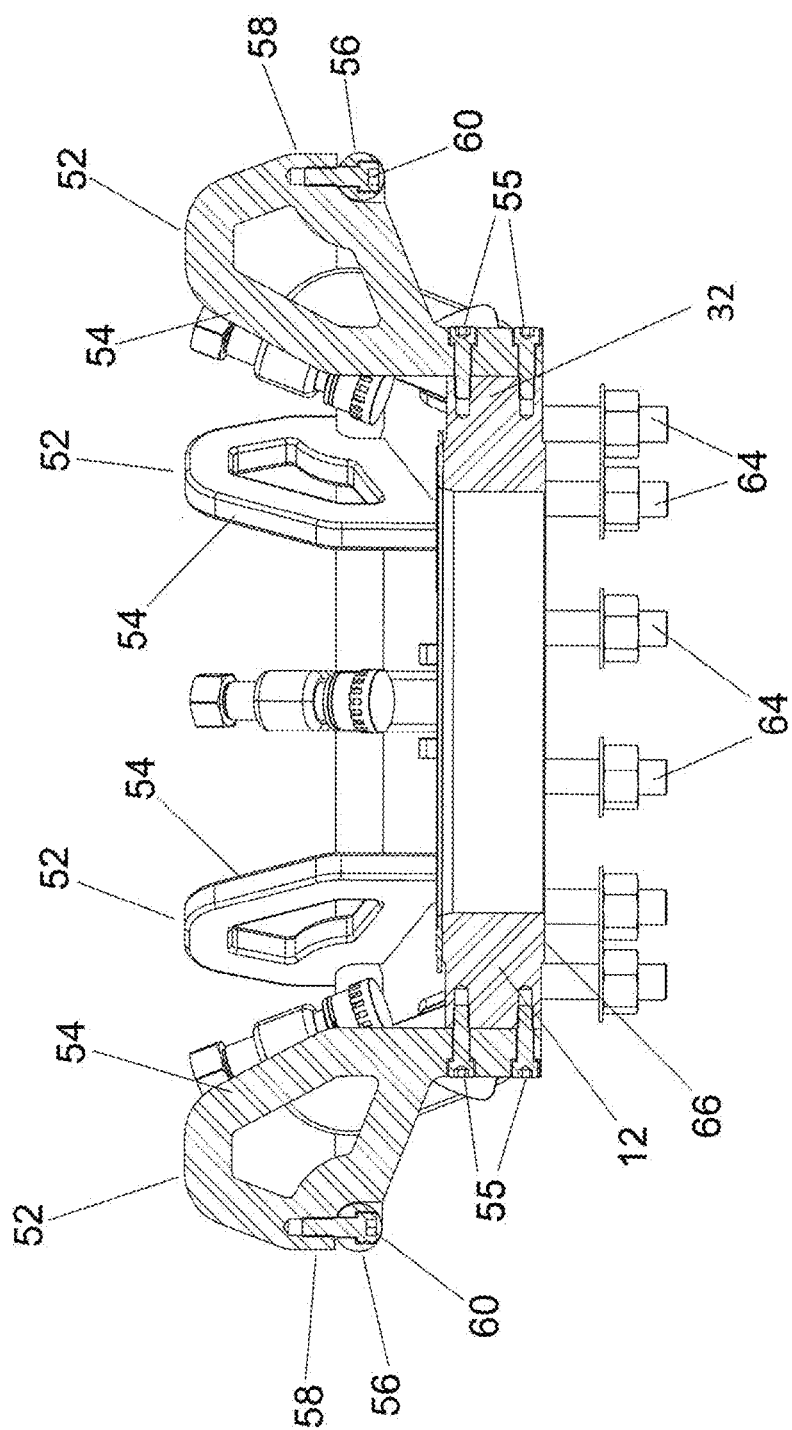
FIG. 7 shows a cross-sectional view of the flange assembly shown in FIG. 1 along the line B-B.

The flange assembly 10 forms part of a modular arrangement. In order to couple the flange 12 to the valve housing, the flange assembly 10 includes a plurality of connecting bolts 64 protruding from a rear surface 66 of the flange 12, as shown in FIG. 7. The connecting bolts 64 are equidistantly spaced about the circumference of the flange 12.

In use, the manifold 100 is connected to a tank that may be located on a vehicle, on a vessel or on land. One end of the manifold 100 is attached to and in fluid communication with the tank. An opposite end of the manifold 100 defines a flange 102 in the form of a disc-shaped rim and having a contact face for engagement with the contact face of the flange 12 of the flange assembly 10. Each clamp body 18 is movable between the retention position for the clamp 16 to retain the flange 102 of the manifold 100 and the release position for the clamp 16 to release the flange 102 of the manifold 100.

The valve 200 is a bidirectional valve. The valve 200 includes a valve housing 202 and a valve component. The valve housing 202 defines a hollow bore along which flowable material may flow in both directions. The valve component is received inside the hollow bore of the valve housing 202. The valve housing 202 further includes a compressible seal that extends around the circumference of a longitudinal section of the hollow bore. The seal may be a tapered seal or a flat seal.

In use, the flange assembly 10 is mounted on the valve housing 202 through the engagement of the connecting bolts 64 within first apertures 68 formed in a flange of a first end of the valve housing 202, and a second end of the valve housing 202 is connected to a hose (not shown) so that the hollow bore of the valve housing 202 is continuous with a hollow bore of the hose. The second end of the valve housing 202 may be connected to a hose in a variety of ways including, but not limited, a flange connection using connecting bolts.

The valve component includes a valve member 204 mounted on an inner wall of the valve housing 202. The valve member 204 includes a flap portion that is shaped in the form of a disc. The diameter of the flap portion is sized so that the flap portion is capable of sealingly engaging with the seal to close the hollow bore of the valve housing 202. Preferably the diameter of the flap portion is 4, 6, 8, 10 or 12 inches.

The valve member 204 is mounted on a spindle that extends through the wall of the valve housing 202 to the exterior of the housing. This allows the valve member 204 to be opened and closed by rotating the spindle from the exterior of the valve housing 202. A handle 206 on the end of the spindle may be rotated by hand or machine in order to rotate the spindle. The machine may include a hydraulically operated actuator, such as one operated by a hydraulic power unit, or a pneumatically operated actuator, such as one operated by a pneumatic power unit.

When the valve member 204 is in a valve open position in which the flap portion is perpendicular to the cross-section of the hollow bore of the valve housing 202 (i.e. the flap portion bisects the hollow bore of the valve housing 202), this opens the hollow bore of the valve housing 202 and thereby permits the flowable material to flow along the hollow bore of the valve housing 202 and therefore the hollow bore of the connected hose. The configuration of the valve member 204 as a flap portion that bisects the hollow bore of the valve housing 202 in the valve open position minimizes the resistance to the flow of the flowable material through the hollow bore of the valve housing 202.

Rotating the handle 206 drives the valve member 204 to a valve closed position in which the flap portion is parallel with the cross-section of the hollow bore of the valve housing 202 and sealingly engages the seal. This closes the hollow bore of the valve housing 202 and thereby prevents the flowable material from flowing along the hollow bore of the valve housing 202 and therefore the hollow bore of the connected hose.

The hollow bore of the valve housing 202 is re-opened by moving the valve member 204 from the valve closed position to the valve open position through operation of the handle 206.

The interlock mechanism 300 includes six first interlock members, each in the form of an abutment pin 302, and a second interlock member in the form of an annular ring 304.

Each abutment pin 302 is housed in a spring-loaded configuration within a respective second aperture formed in the flange of the first end of the valve housing 202. The second apertures are equidistantly spaced about the circumference of the flange of the valve housing 202 so that the first and second apertures 68 are alternately arranged about the circumference of the flange of the valve housing 202. Each abutment pin 302 is aligned with a respective one of the clamp bodies 18 so that each clamp body 18 in the release position pushes against the respective abutment pin 302 so as to cause displacement of the abutment pin 302.

It will be appreciated that the number of abutment pins 302 may vary depending on the number of clamps 16.

The annular ring 304 is rotatably mounted around the circumference of the valve housing 202 and adjacent to the flange of the first end of the valve housing 202 so that the annular ring 304 is rotatable relative to the flange. The annular ring 304 includes a plurality of receptacles 306 that are equidistantly spaced about the circumference of the annular ring 304 so that, in a first rotational position of the annular ring 304, each receptacle 306 is aligned with a respective one of the abutment pins 302 and so that, in a second rotational position of the annular ring 304, each receptacle 306 is rotationally offset from the respective abutment pin 302.

When the annular ring 304 is in the first rotational position, each abutment pin 302 is displaceable by the respective clamp body 18 for engagement within the respective receptacle 306. When each clamp body 18 is moved from the release position to the retention position, the spring-loaded configuration of each abutment pin 302 urges the abutment pins 302 to exit the respective receptacles 306 and thereby return to their original positions. Each receptacle 306 includes a bore with a tapered section having an inclined inner wall face 308 that prevents the abutment pins 302 from getting stuck during the process of exiting the respective receptacles 306.

When the annular ring 304 is in the second rotational position, the rotational offset between the receptacles 306 and the abutment pins 302 prevents the displacement of the abutment pins 302 by the clamp bodies 18 and thereby prevents the movement of the clamp bodies 18 from the retention position to the release position, thus locking the clamp bodies 18 in the retention position.

A location pin 310 is formed at a fixed position on the circumference of the annular ring 304. The location pin 310 is slidably received within an arcuate groove 208 formed in the handle 206 of the spindle so that rotating the handle 206 causes a sliding movement of the location pin 310 relative to the groove 208 between first and second ends of the groove 208. When the location pin 310 is received within the first end of the groove 208, the annular ring 304 is in the first rotational position and the valve member 204 is in the valve closed position. Rotating the handle 206 causes the relative movement of the location pin 310 away from the first end and towards the second end. This in turn causes rotational movement of the location pin 310 and therefore the annular ring 304 about an axis of the valve housing 202. When the location pin 310 is received within the second end of the groove 208, the annular ring 304 is in the second rotational position and the valve member 204 is in the valve open position. Similarly, the handle 206 can be rotated in the opposite direction to cause a sliding movement of the location pin 310 relative to the groove 208 from the second end to the first end in order to cause the annular ring 304 to rotate from the second rotational position to the first rotational position. Hence, the groove 208 in the handle 206 effectively acts as a cam to drive the rotation of the annular ring 304.

The first end of the groove 208 is formed to include a detent structure 210 that receives and operably locates the location pin 310 so that, when the location pin 310 is received within the first end, the detent structure 210 resists any movement of the location pin 310 away from the first end in order to lock the valve member 204 in the valve closed position. Application of a sufficiently large torque to the handle 206 is required to overcome the detent structure 210 and move the location pin 310 away from the first end.

In this way the rotation of the annular ring 304 is operably linked to the rotation of the valve member 204.

The annular ring 304 can be locked in the first rotational position by each clamp body 18 in the release position displacing the respective abutment pin 302 into the respective receptacle 306. Thus, the annular ring 304 is prevented from rotating about an axis of the valve housing 202, thereby locking the valve member 204 in the valve closed position.

When the valve member 204 is in the valve open position, the annular ring 304 is in the second rotational position that as mentioned above prevents the displacement of the abutment pins 302 by the clamp bodies 18 and thereby locks the clamp bodies 18 in the retention position.

When the valve member 204 is in the valve closed position, each clamp body 18 is permitted to freely move between the retention and release positions due to the abutment pins 302 being permitted to freely enter and exit the respective receptacles 306.

When each clamp body 18 is in the retention position, the valve member 204 is permitted to freely move between the valve open and closed positions due to the abutment pins 302 not hindering the rotational movement of the annular ring 304.

In this way the flange assembly 10, the valve 200 and the interlock mechanism 300 combine to form a fluid interlock conduit.

The fluid conduit interlock further includes a blank plate 400 configured to removably engage the contact face of the flange of the flange assembly 10. The blank plate 400 comprises a central disc having circumferentially arranged projections, the positions of which correspond to the circumferential positions of the clamps 16. The blank plate 400 includes an integrated valve and pressure gauge to monitor any fluid conduit purging.

The blank plate 400 is fitted into the flange assembly 10 by first configuring the clamps 16 in the release position, rotationally offsetting the circumferential positions of the projections relative to the circumferential positions of the clamps 16, bringing the blank plate 400 into engagement with the contact face of the flange of the flange assembly 10, rotating the blank plate 400 to align the projections and clamps 16, and then laterally moving the clamp members 20 to engage the respective projections to retain the blank plate 400 in place. Accordingly, when the blank plate 400 is retained by the flange assembly 10, the clamp bodies are locked in the release position that in turn locks the valve member 204 in the valve closed position.

Operation of the fluid conduit interlock is described as follows with reference to FIGS. 8 to 26.

Initially the fluid conduit interlock is disconnected from the manifold 100 and the hose. That is to say, the flange of the flange assembly 10 is disconnected from the manifold 100 and the second end of the valve housing 202 is disconnected from the hose. At this stage the blank plate 400 is fitted into the flange assembly 10, the clamp bodies 18 are in the release position and the detent structure 210 locates the location pin 310 of the annular ring 304 so as to lock the valve member 204 in the valve closed position.

Figure 8:
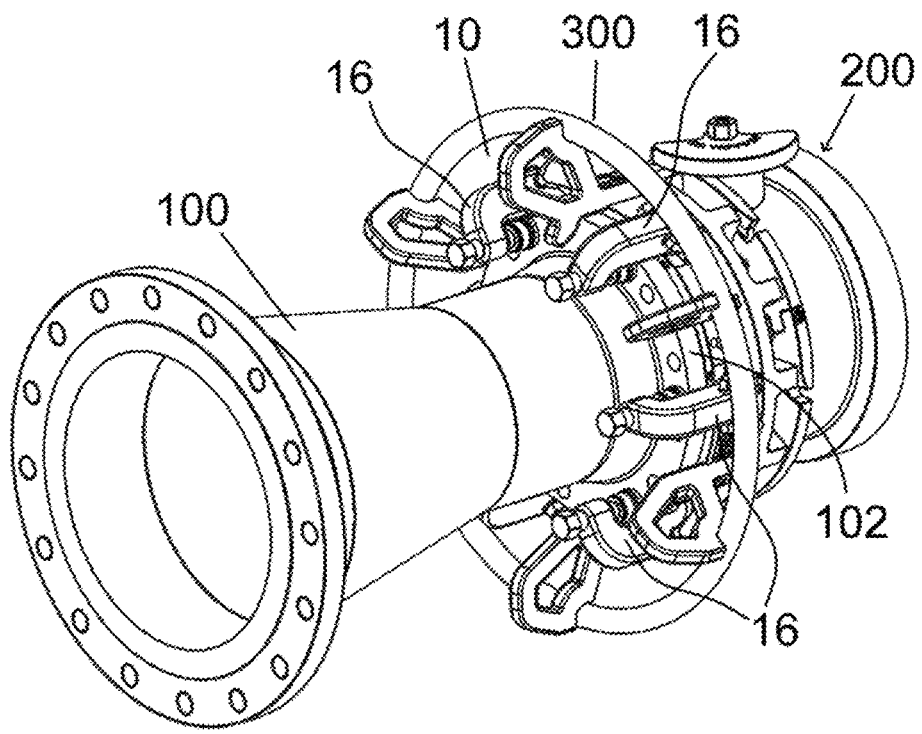
FIG. 8 shows the flange assembly of FIG. 1 in connection with a manifold, an interlock mechanism and a valve.
Figure 9:
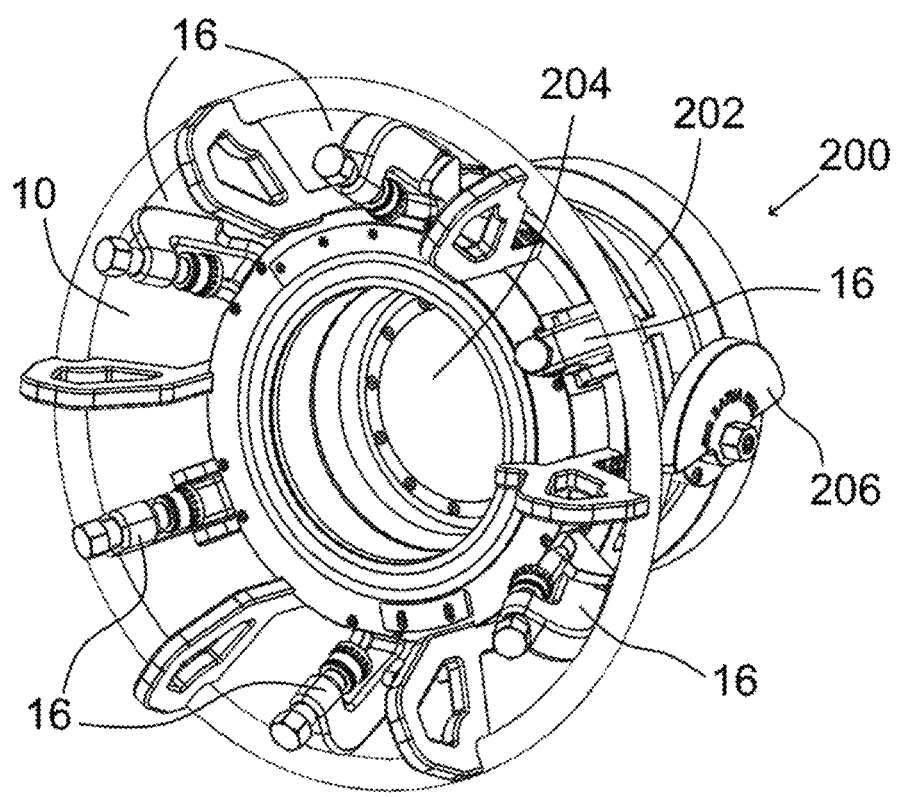
FIG. 9 shows a state of a fluid conduit interlock when clamp bodies of a flange assembly are in a release position and a valve member of a valve is in a valve closed position, according to an exemplary embodiment.
Figure 10:
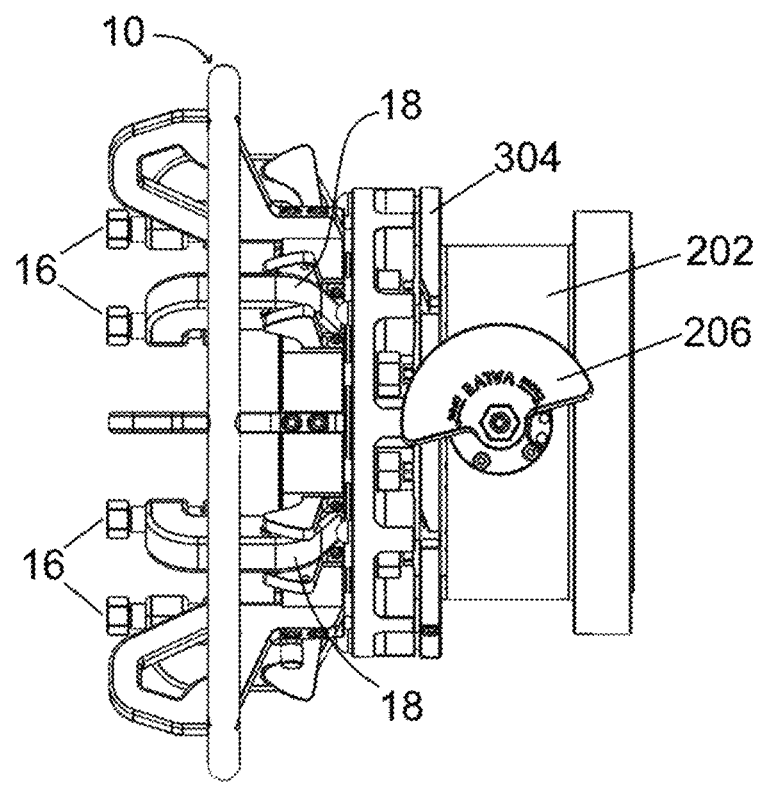
FIGS. 10 to 14 show a state of a fluid conduit interlock when clamp bodies of a flange assembly are in a retention position and a valve member of a valve is in a valve closed position, according to an exemplary embodiment.
Figure 11:
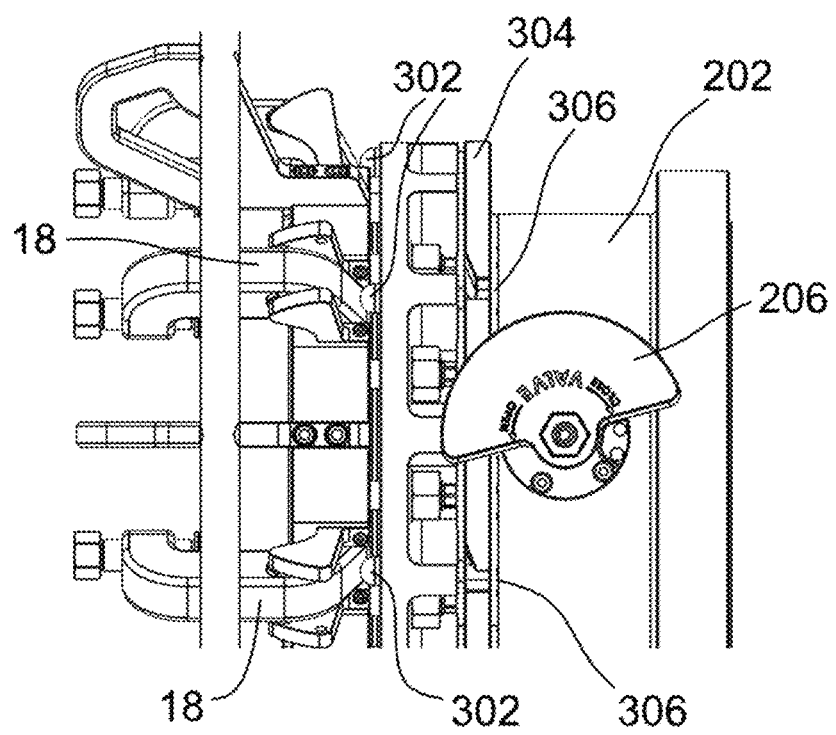
Figure 12:
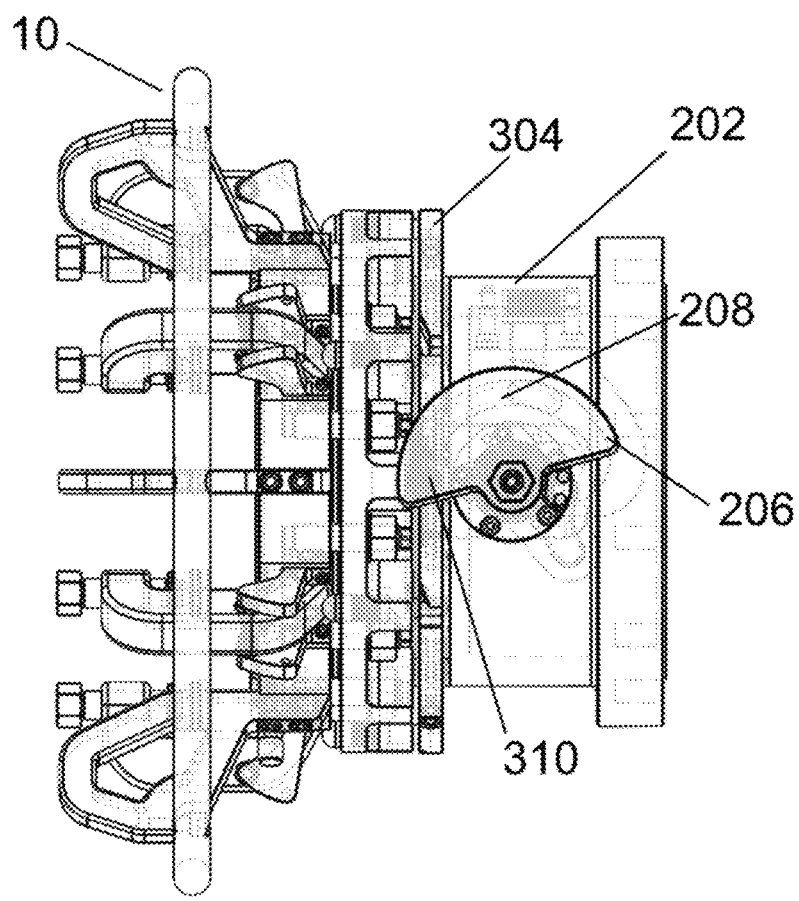
Figure 13:
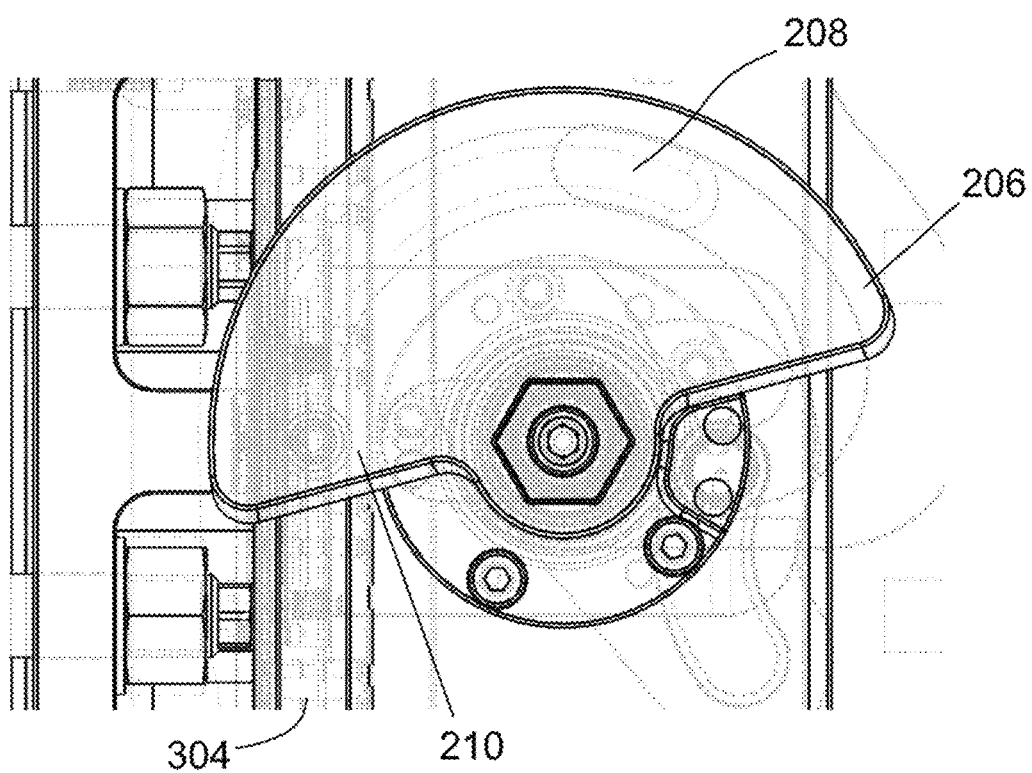
Figure 14:
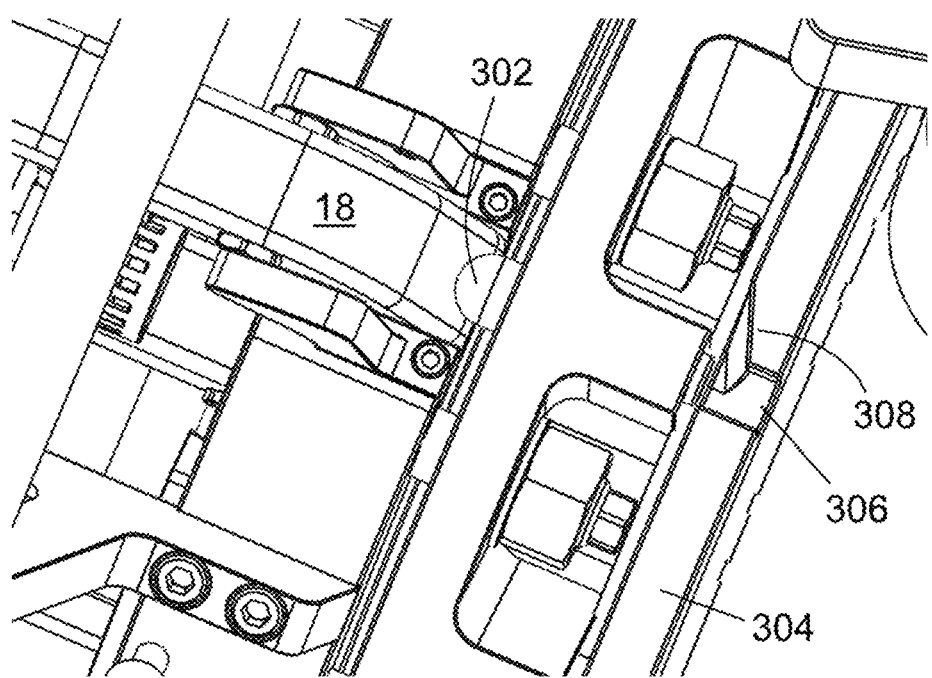
Figure 15:
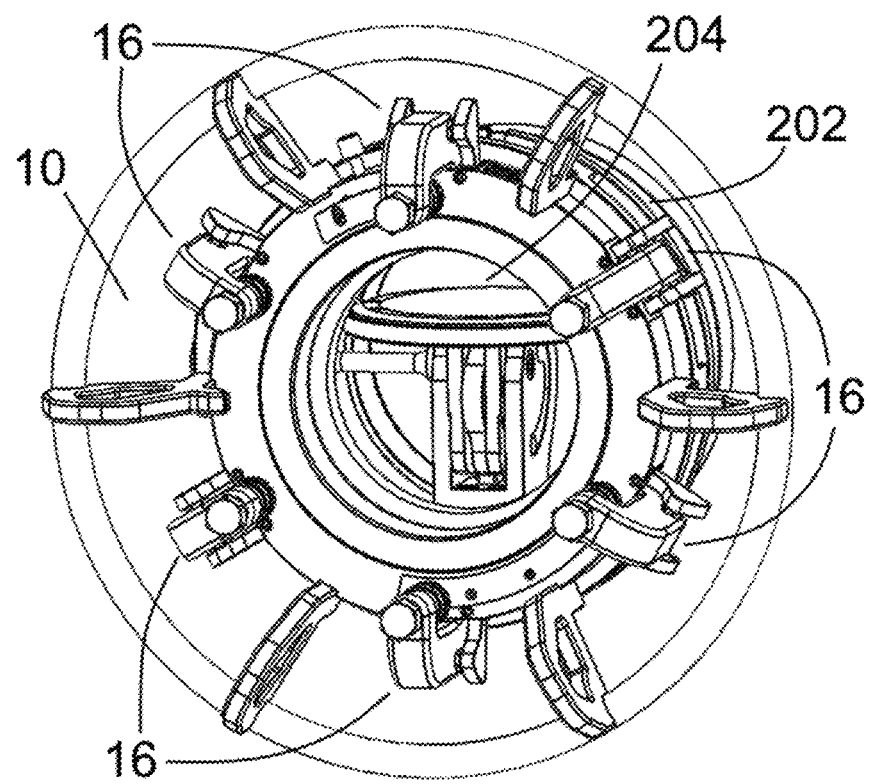
FIGS. 15 to 18 show a state of a fluid conduit interlock when clamp bodies of a flange assembly are in a retention position and a valve member of a valve is in a valve open position according to an exemplary embodiment.
Figure 16:
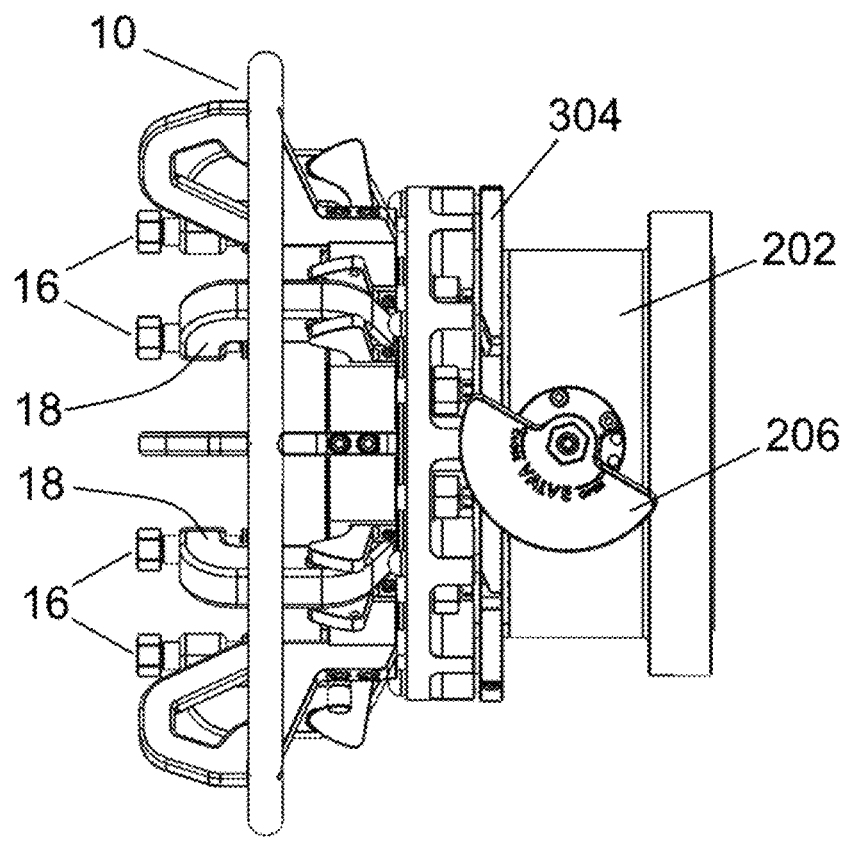
Figure 17:
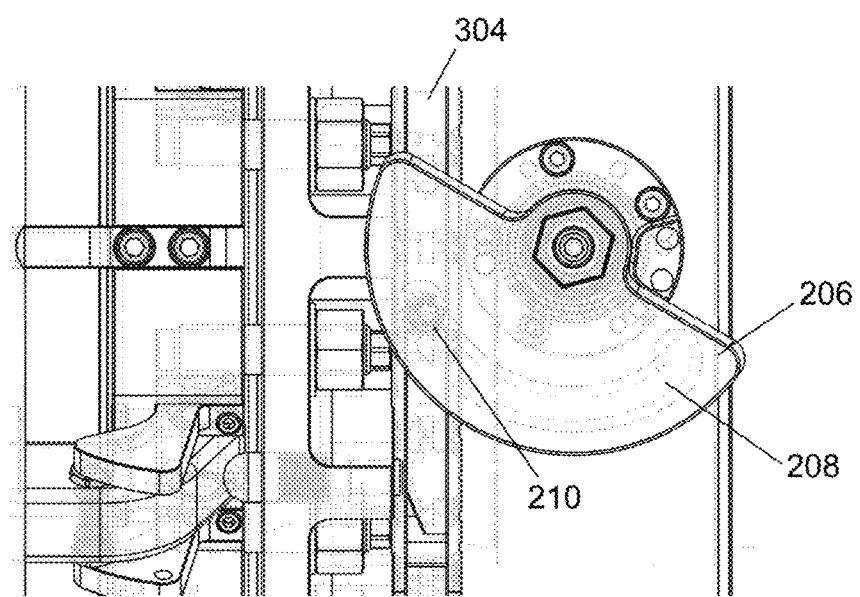
Figure 18:
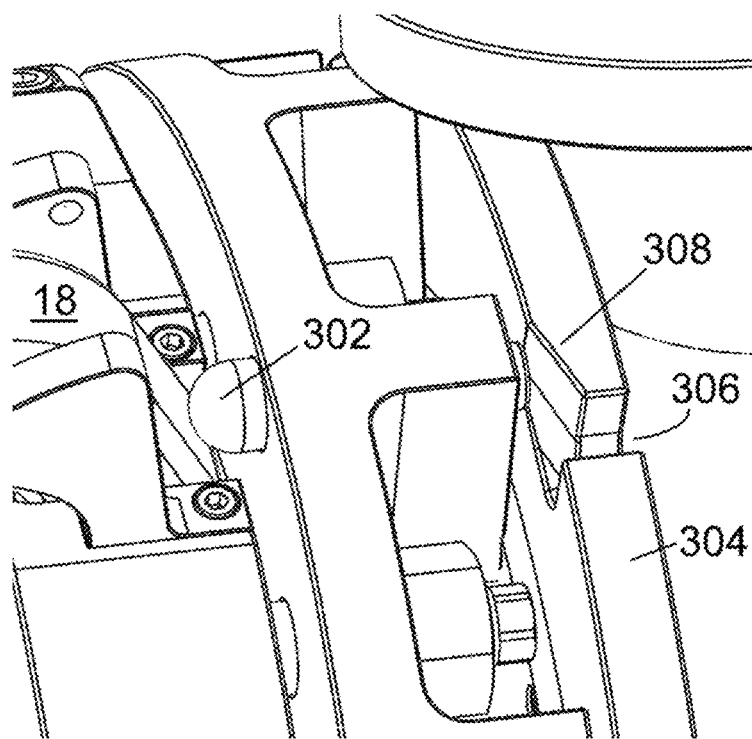
Figure 19:
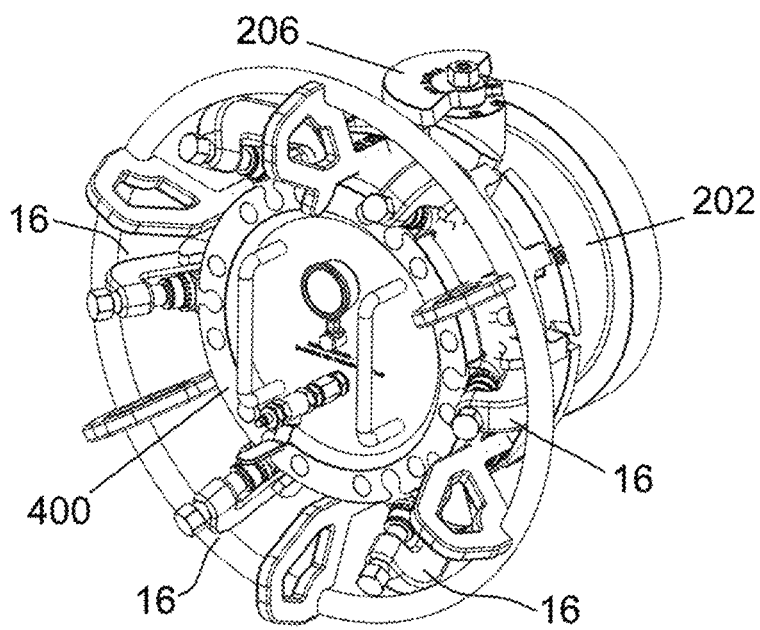
FIGS. 19 to 26 show a state of a fluid conduit interlock when a blank plate is fitted to a flange assembly, clamp bodies of the flange assembly are in a release position and a valve member of a valve is in a valve closed position, according to a exemplary embodiment.
Figure 20:
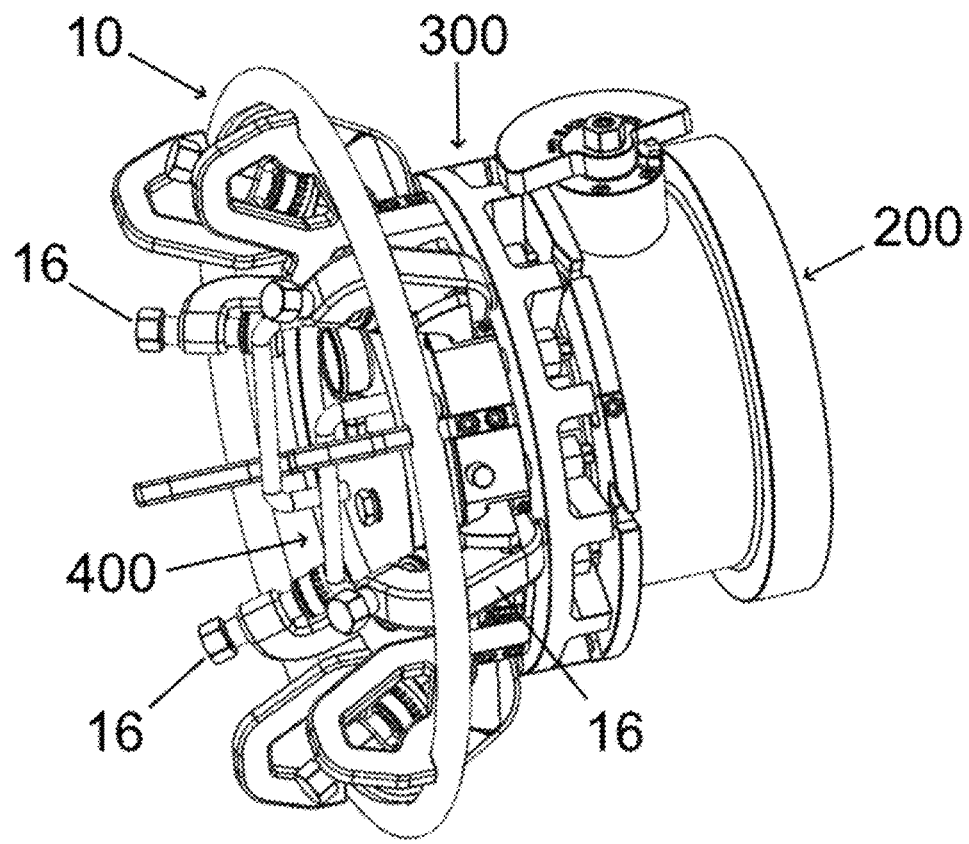
Figure 21:
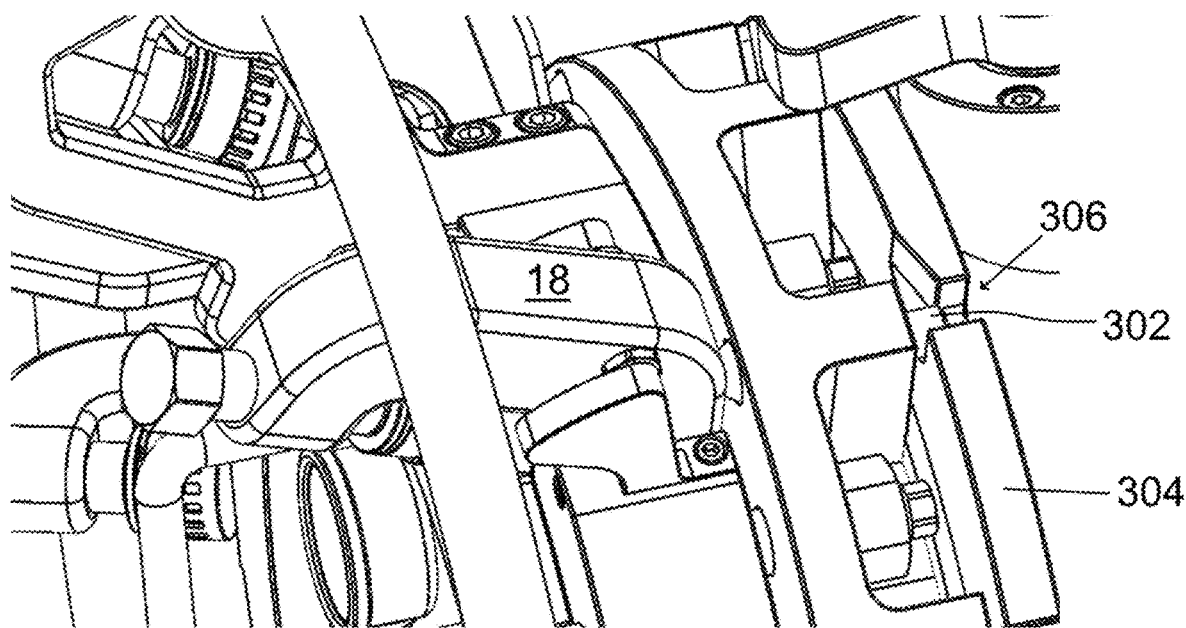
Figure 22:
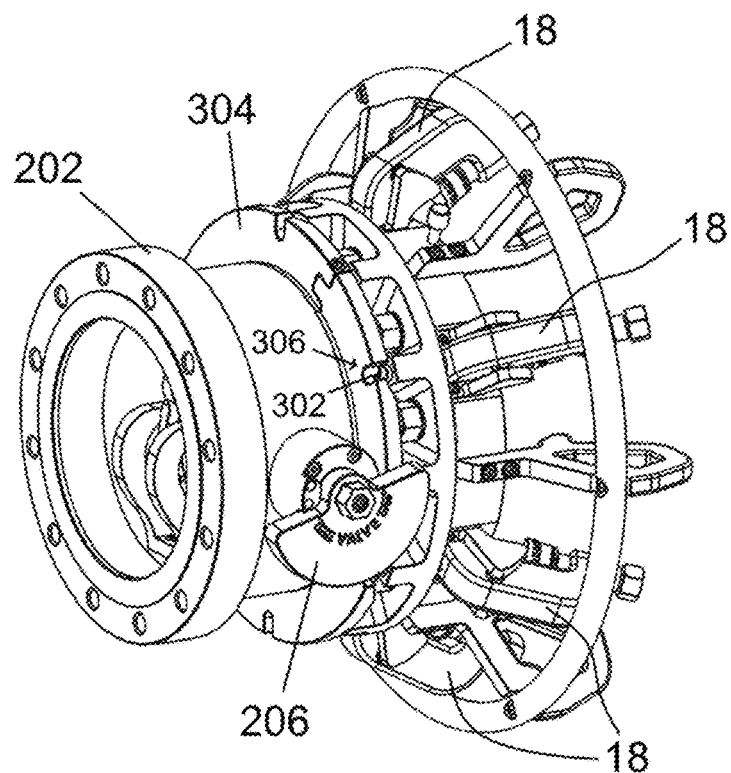
Figure 23:
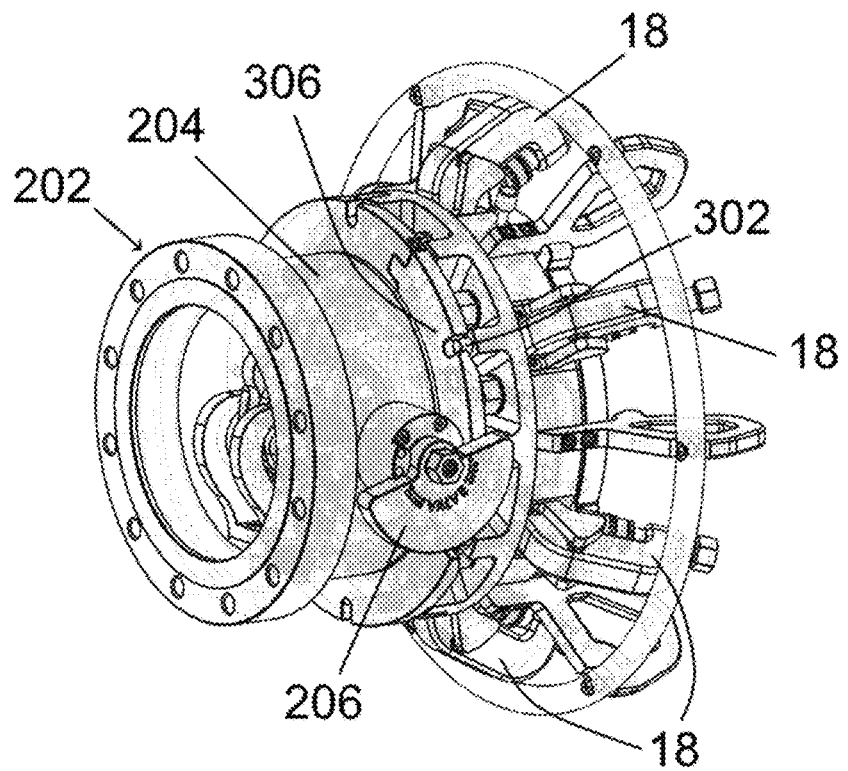
Figure 24:
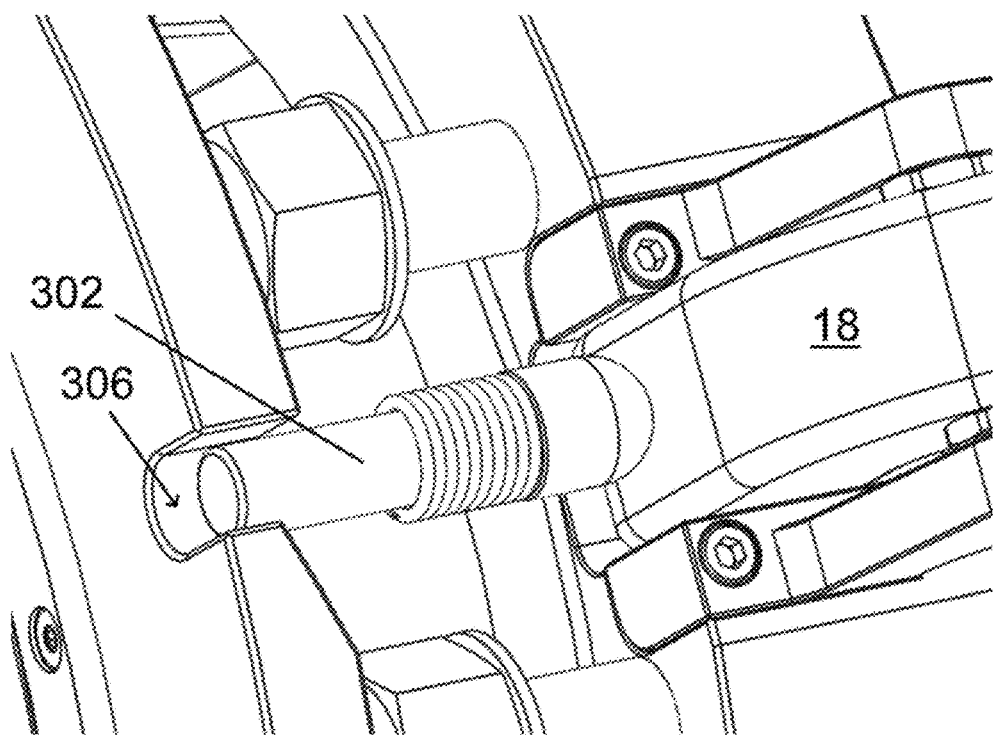
Figure 25:
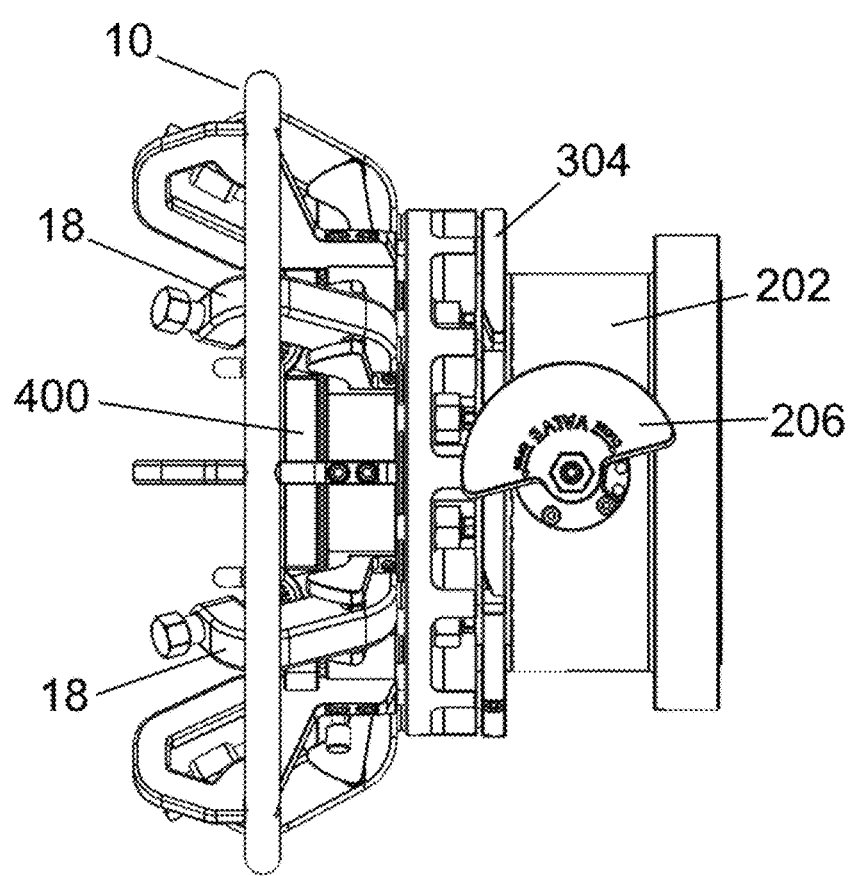
Figure 26:
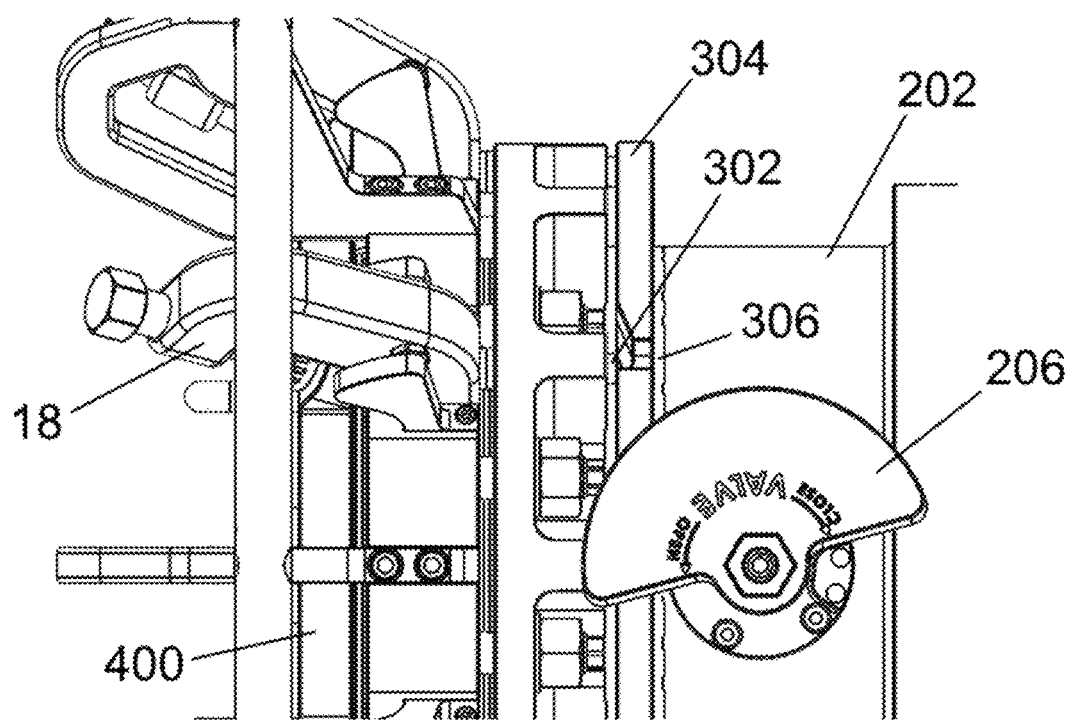

To start a fluid transmission process, the second end of the valve housing 202 is connected to the hose. The closed state of the valve member 204 ensures that there is no spillage in the event of accidental transmission of flowable material through the hose. The blank plate 400 is then removed from the flange assembly 10 (FIG. 9) followed by the flange 102 of the manifold 100 being brought into engagement with the flange 12 of the flange assembly 10 (FIG. 8). The clamp bodies 18 are then moved to the retention position to clamp the flange 102 of the manifold 100 so that the manifold 100 is held in fluid communication with the valve housing 202 to complete the fluid transmission assembly.

As a result of moving the clamp bodies 18 to the retention position, the abutment pins 302 automatically return to their original positions by virtue of their spring-loaded configurations (FIGS. 10 to 14). This permits the valve member 204 to be moved from the valve closed position to the valve open position and at the same time permits the annular ring 304 to be rotate to the second position (FIGS. 15 to 18) to commence the transfer of flowable material along the fluid transmission assembly. Since the valve member 204 in the valve open position prevents the clamp bodies 18 from moving back to the release position by way of the annular ring 304 in the second position resisting the displacement of the abutment pins 302 into the respective receptacles 306 of the annular ring 304, accidental release of the manifold 100 from the flange assembly 10 is avoided during the transfer of the flowable material.

After the transfer of flowable material is completed, the valve member 204 is then moved to the valve closed position to close off the hollow bore, thereby returning the annular ring 304 to the first position and enabling the detent structure 210 to locate the location pin 310. This permits the clamp bodies 18 to move back to the release position to release the flange 102 of the manifold 100 from the flange assembly 10. The blank plate 400 is refitted to the flange assembly 10 to hold the clamp bodies 18 in the release position and thereby maintain the valve member 204 in the closed position (FIGS. 19 to 26). This ensures that the hollow bore of the valve housing 202 stays closed to prevent any spillage of flowable material from the hose, which may otherwise arise as a result of leftover flowable material or an existing fluid pressure inside the hose.

The fluid conduit interlock therefore permits quick release of the hose from the manifold 100 in a way that removes the risk of accidental spillage from the hose without requiring operator intervention.

It is envisaged that, in other embodiments of the invention, the interlock mechanism 300 may be retrofitted to existing flange assemblies and valves, or the flange assembly 10 and the interlock mechanism 300 may be retrofitted to existing valves, or the flange assembly 10, interlock mechanism 300 and valve 200 may be provided as an integrated apparatus.

The listing or discussion of an apparently prior published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid conduit interlock as shown in the various exemplary embodiments is illustrative only. Additionally, any element disclosed in one embodiment may be incorporated or utilized with any other embodiment disclosed herein. For example, the blank plate of the exemplary embodiment shown in at least FIG. 26 may be incorporated in the fluid conduit interlock of the exemplary embodiment shown in at least FIG. 10. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluid conduit interlock comprising:
   at least one retention member for engaging a fluid conduit, the or each retention member configured to be movable between a retention position for retaining the fluid conduit and a release position for releasing the fluid conduit;
a valve member configured to be movable between a valve open position for opening a hollow bore and a valve closed position for closing the hollow bore; and
an interlock mechanism configured to operably link the movement of the or each retention member and the movement of the valve member so that the or each retention member in the release position locks the valve member in the valve closed position and so that the valve member in the valve open position locks the or each retention member in the retention position,
wherein the interlock mechanism includes at least one first interlock member and a second interlock member, the second interlock member movable between first and second positions,
wherein the movement of the second interlock member is operably linked to the movement of the valve member so that the second interlock member is in a first position when the valve member is in the valve closed position and so that the second interlock member is in a second position when the valve member is in the valve open position,
wherein the or each retention member is configured to be movable from the retention position to the release position to displace the or each respective first interlock member into engagement with the second interlock member so as to lock the second interlock member in the first position,
wherein the second interlock member in the second position is configured to prevent the displacement of the or the respective first interlock member into engagement with the second interlock member so as to prevent the movement of the or each retention member from the retention position to the release position.

2. A fluid conduit interlock according to claim 1, wherein the or each retention member is configured for engaging a flange of the fluid conduit, the or each retention member configured to be movable between the retention position for retaining the flange and the release position for releasing the flange.

3. A fluid conduit interlock according to claim 1, wherein the interlock mechanism is configured to operably link the movement of the or each retention member and the movement of the valve member so that the or each retention member is permitted to freely move between the retention and release positions when the valve member is in the valve closed position and/or so that the valve member is permitted to freely move between the valve open and closed positions when the or each retention member is in the retention position.

4. A fluid conduit interlock according to claim 1, wherein the or each first interlock member is an abutment member, and the or each retention member is configured to be movable from the retention position to the release position to abut the respective abutment member into engagement with the second interlock member so as to lock the second interlock member in the first position.

5. A fluid conduit interlock according to claim 1, wherein the or each first interlock member is spring-loaded to urge the or each first interlock member to disengage from the second interlock member when the or each retention member is moved from the release position to the retention position.

6. A fluid conduit interlock according to claim 1, wherein the second interlock member includes an annular ring or at least one annular ring segment, the second interlock member rotatable between the first and second positions.

7. A fluid conduit interlock according to claim 1, wherein the second interlock member includes at least one receptacle for receiving the or each respective first interlock member, and the or each first interlock member is configured to be movable into and out of the or each receptacle.

8. A fluid conduit interlock according to claim 7, wherein the or each receptacle includes a bore, the or each bore having a tapered section through which the or each first interlock member may pass in order to move into and out of the or the respective receptacle.

9. A fluid conduit interlock according to claim 1, further comprising an actuator operable to move the valve member between the valve open and closed positions, wherein the actuator includes a detent structure configured to operably locate the second interlock member when the valve member is in the valve closed position so as to lock the valve member in the valve closed position.

10. A fluid conduit interlock according to claim 1, wherein the or each retention member is a clamp configured to be pivotable between the retention and release positions.

11. A fluid conduit interlock according to claim 1, further comprising a valve housing defining the hollow bore along which flowable material may flow, the valve member arranged inside the valve housing.

12. A fluid conduit interlock according to claim 11, wherein the interlock mechanism is attached to, mounted on, or integral with the valve housing.

13. A fluid conduit interlock comprising:
at least one retention member for engaging a fluid conduit, the or each retention member configured to be movable between a retention position for retaining the fluid conduit and a release position for releasing the fluid conduit;
a valve member configured to be movable between a valve open position for opening a hollow bore and a valve closed position for closing the hollow bore;
an interlock mechanism configured to operably link the movement of the or each retention member and the movement of the valve member so that the or each retention member in the release position locks the valve member in the valve closed position and so that the valve member in the valve open position locks the or each retention member in the retention position; and
a blank configured to removably engage the or each retention member so as to maintain the or each retention member in the release position.

14. A method of operating a fluid conduit interlock, wherein
the fluid conduit interlock is in accordance with claim 1, wherein the method comprises the steps of:
providing a fluid conduit;
releasing the fluid conduit by moving the valve member to the valve closed position and then moving the or each retention member to the release position;
moving the or each retention member from the retention position to the release position to displace the or the respective first interlock member into engagement with the second interlock member so as to lock the second interlock member in the first position;
retaining the fluid conduit by moving the or each retention member to the retention position and then moving the valve member to the valve open position; and
moving the second interlock member to the second position to prevent the displacement of the or the respective first interlock member into engagement with the second interlock member so as to prevent the movement of the or each retention member from the retention position to the release position.

15. A method according to claim 14, wherein the or each retention member is configured for engaging a flange of the fluid conduit, the or each retention member configured to be movable between the retention position for retaining the flange and the release position for releasing the flange, the method further comprising the steps of:
   releasing the flange of the fluid conduit by moving the valve member to the valve closed position and then moving the or each retention member to the release position; and
   retaining the flange of the fluid conduit by moving the or each retention member to the retention position and then moving the valve member to the valve open position.

16. A method according to claim 14, wherein the or each first interlock member is an abutment member, and the or each retention member is configured to be movable from the retention position to the release position to abut the respective abutment member into engagement with the second interlock member so as to lock the second interlock member in the first position, the method further comprising the step of moving the or each retention member from the retention position to the release position to abut the or the respective abutment member into engagement with the second interlock member so as to lock the second interlock member in the first position.

17. A method according to claim 14, wherein the fluid interlock includes an actuator operable to move the valve member between the valve open and closed positions, wherein the actuator includes a detent structure configured to operably locate the second interlock member when the valve member is in the valve closed position so as to lock the valve member in the valve closed position, the method further comprising the step of positioning the detent structure to locate the second interlock member when the valve member is in the valve closed position so as to lock the valve member in the valve closed position.

18. A method of operating a fluid conduit interlock, wherein the fluid conduit interlock is in accordance with claim 13, the method comprising the steps of:
   providing a fluid conduit;
   releasing the fluid conduit by moving the valve member to the valve closed position and then moving the or each retention member to the release position;
   fitting the blank to engage the or each retention member so as to maintain the or each retention member in the release position;
   removing the blank from the or each retention member so as to permit movement of the or each retention member from the release position; and
   retaining the fluid conduit by moving the or each retention member to the retention position and then moving the valve member to the valve position.

* * * * *